United States Patent [19]

Shaw

[11] 4,190,682
[45] Feb. 26, 1980

[54] PROCESS FOR IMPREGNATING A CAPACITOR WITH A NON-HALOGENATED IMPREGNANT

[75] Inventor: David G. Shaw, Glens Falls, N.Y.

[73] Assignee: General Electric Company, Hudson Falls, N.Y.

[21] Appl. No.: 949,409

[22] Filed: Oct. 10, 1978

Related U.S. Application Data

[60] Continuation-in-part of Ser. No. 784,144, Apr. 4, 1977, abandoned, which is a division of Ser. No. 669,755, Mar. 24, 1976, abandoned.

[51] Int. Cl.² ............................ B05D 5/12; H01G 4/04
[52] U.S. Cl. .................................. 427/79; 361/315; 361/319; 252/64; 427/121
[58] Field of Search .................. 317/258, 259; 252/64, 252/65, 66, 63.7; 361/315, 318, 319; 427/79, 121

[56] References Cited

U.S. PATENT DOCUMENTS

| | | | |
|---|---|---|---|
| 2,636,074 | 4/1953 | Ross | 361/37 |
| 3,788,998 | 1/1974 | Coquillion | 252/66 |
| 3,833,978 | 9/1974 | Eustance | 252/64 |

OTHER PUBLICATIONS

Reynolds et al., Evaluation of Dielectric Fluids by Gassing Cell Test, Proc. IEE vol. 119 #4, Apr. 1972.

Primary Examiner—Michael F. Esposito
Assistant Examiner—Richard Bueker
Attorney, Agent, or Firm—James J. Lichiello

[57] ABSTRACT

A process for impregnating capacitors with a gas absorbing impregnant is disclosed including the steps of purefying a phthalate ester by adsorptive filtration and adding 5 to 30% by volume of an alkene having from 10 to less than 20 carbon atoms and 0.1 to 10% by volume of an epoxy stabilizer to the phthalate ester prior to impregnating the capacitor.

5 Claims, 2 Drawing Figures

PROCESS FOR IMPREGNATING A CAPACITOR WITH A NON-HALOGENATED IMPREGNANT

This application is a continuation in part application of pending prior application Ser. No. 784,144 filed Apr. 4, 1977 now abandoned which was a division of application Ser. No. 669,755 filed Mar. 24, 1976 now abandoned and assigned to the same assignee as the present invention.

BACKGROUND OF THE INVENTION

This invention relates to a dielectric liquid impregnant for electrical devices and more particularly to an electrical capacitor utilizing a unique combination of gas absorbing impregnant materials which provide an improved dielectric liquid impregnant theretofore.

Liquid impregnants for electrical capacitors should have a high dielectric constant, maintain a low dissipation factor, and be compatible with the other materials utilized in capacitor structure. At the same time, the impregnant must withstand elevated and fluctuating temperature, pressure, and voltage stress conditions with excellent electrical characteristics for a long operative life of the capacitor.

The polychlorinated biphenyls as capacitor impregnants meet these requirements and were eminently satisfactory for several decades. The polychlorinated biphenyls, a term which is inclusive of chlorinated diphenyl as used herein, are broadly referred to as PCBs. The polychlorinated biphenyls have recently been associated with ecological problems, restrictive use limitations, and rising costs. These problems of chlorinated diphenyls has spurred the search for a suitable replacement capacitor impregnant which would have some advantageous impregnant characteristics comparable to those of the chlorinated diphenyls, and still provide outstanding electrical and compatibility performance with the two most important present day capacitor solid dielectrics, paper and polypropylene. A primary candidate for a replacement impregnant is an ester base fluid. However, in the utilization of paper and polypropylene dielectric materials with ester based impregnants, it was found that, in the capacitor environment, principally hydrogen gas was evolved from the ester or the environment and by contributing to ionization and corona discharge shortened the effective life of the capacitor. Gas evolution, under certain capacitor conditions of elevated temperatures and high electrical stresses appears to be a problem with other candidate impregnants although the esters and some other candidates are ordinarily gas absorbing materials. Accordingly, it is an object of this invention to provide an improved hydrogen gas stable impregnant for electrical devices.

SUMMARY OF THE INVENTION

In one preferred form of this invention an electrical capacitor is impregnated with a non halogen base impregnant comprising a branch chain ester to which has been added an olefinic material which is more gas absorptive than the ester over a given capacitor range of temperatures.

DESCRIPTION OF THE DRAWINGS

This invention will be better understood when taken in connection with the following specification and the drawings in which

Referring now to FIG. 1, there is shown a typical small industrial or motor run alternating current capacitor 10 which utilizes the impregnant 11 of this invention. Capacitor 10 comprises a casing 12 in which there is a capacitor roll section 13 connected by appropriate leads (not shown) to external terminals 14 and 15 in a cover 16. Cover 16 is sealed to casing 12 and the capacitor roll section 13 is vacuum impregnated through fill hole 17 with the impregnant 11, and may be submerged in the impregnant 11 which fills the casing 12. Accordingly, cover 16 is tightly sealed to the casing 12 to prevent leakage of the impregnant, and fill hole 17 is solder sealed to retain evacuated conditions.

Referring now to FIG. 2, there is shown an alternating current power capacitor 20 which utilizes the impregnant of the present invention. Power capacitors which are inclusive of power factor correction capacitors are usually rated in kilovars at a given or rated voltage and may be on the order of 150 to 200 kilovars each. Such a capacitor 20 as illustrated includes a very large casing 21 in which there is positioned a serial row of individual capacitor roll sections 22. These roll sections are suitably electrically connnected to terminals 23 and 24. The casing is filled with the impregnant 11 of this invention which essentially completely impregnates the capacitor roll sections.

DESCRIPTION OF PREFERRED EMBODIMENTS

Figure 1:
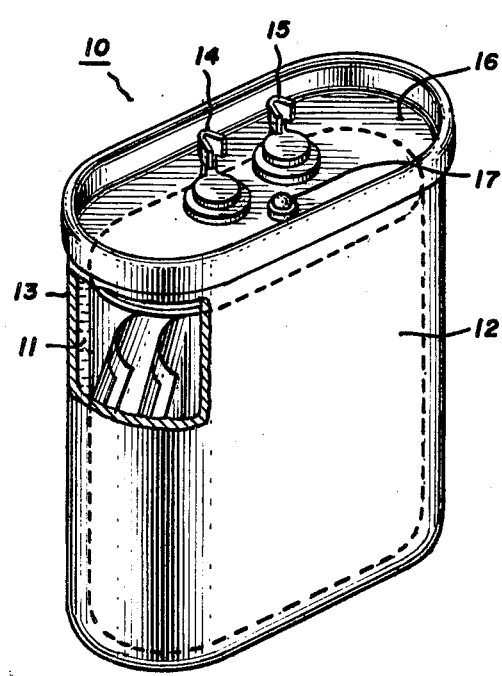
FIG. 1 is a single roll capacitor utilizing the liquid impregnant of the present invention.
Figure 2:
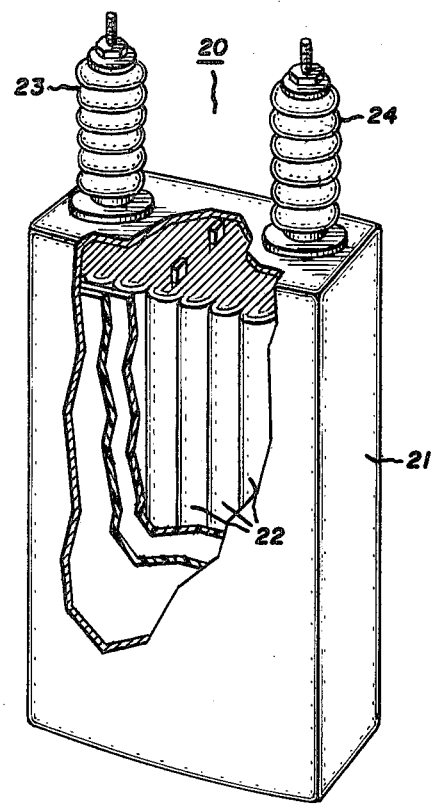
FIG. 2 is a high voltage power capacitor including a plurality of capacitor roll sections and impregnated with the impregnant of the present invention.

It is known that some capacitor impregnants have a tendency to absorb gases and some have a tendency to evolve gases, when they are placed in an operative electrical capacitor environment. Gas absorption or evolvement measurements carried on in non capacitor test cells provide gas absorption values in microliters per minute.* A gas absorbing material provides a negative value and is denoted gas negative, and a gas evolving material provides a positive value and is denoted gas positive. Ordinarily, the distinction is believed to be attributable to the aromaticity of the impregnant. For example, a common capacitor impregnant as mineral oil was known to be more desirable when it contained a significant aromatic content or portion. Another common impregnant, chlorinated diphenyl, is considered aromatic and gas absorbing. The same is true for the ester impregnants such as dioctyl phthalate and other aromatic esters specifically. In the absence of aromaticity it was known to add gas absorbing materials as well as aromatic materials to otherwise gas evolving impregnants to minimize hydrogen gas evolvement, with the material depending on, in some cases, if the fluid were to be used in an alternating current or direct current capacitor.

*Evaluation of Dielectric Fluids by Gassing Cell Tests—Reynolds and Black Proc. IEE Vol. 119 #4, April 1972.

In the use of aromatic esters such as the phthalates and specifically 2-ethyl hexyl phthalate in electrical capacitors, it was discovered that the use of an olefinic gas absorbing material had a marked effect on alternating current capacitor life in spite of the fact that the ester is basically a gas absorbing material in the first instance. Improved capacitor technology now provides much thinner capacitor dielectrics operating at very high stresses and newer dielectrics such as synthetic resin films, for example, polypropylene film. Alternating current stresses on these materials range from about 500 volts per mil thickness for paper to above about 1200 volts per mil thickness of polypropylene. These highly stressed dielectric systems may operate at higher temperatures and close to their corona level at rated voltage. Under these high temperature, high stress conditions, the cumulative effect of partial discharges in a capacitor create or evolve gases from the capacitor environment which lead to early capacitor failure. These gases may be evolved, over a short span of time, as in hot spot conditions, in larger quantities than the impregnant can absorb in the same time limit and accordingly serious damage can take place before the gases are effectively absorbed. More gas may be evolved where the capacitor is highly stressed and operating near the corona level. Accordingly, the relative gassing rates of the capacitor impregnant has a significant bearing on the corona start voltage, the corona extinguishing voltage and capacitor life.

The olefinic gas absorbing materials of this invention are chosen as those which have greater gas absorbing values than the host impregnant, are capacitor compatible and which can be used in smaller quantities so as not to interfere with or adversely affect the primary capacitor impregnant. The olefinic materials are the better candidate materials because their unsaturated chemical structure provides good gas absorbing potential. The olefins are characterized by aliphatic double bonds. The term olefin or alkene ($C_rH_2n$) is used specifically to refer to the homologous series in which at least one aliphatic double bond is present in the molecule, as in ethylene and 1-butene. The term olefinic as herein employed includes the mono olefins, diolephins, triolefins, etc., as well as the cyclo olefins and other olefinic compounds. The preferred olefins for this invention are taken from the class of alpha olefin materials, particularly those having 10 or more carbon atoms, such as decene, dodecene, tetradecene, hexadecene, octadecene, etc. These materials are aliphatic unsaturated hydrocarbons, and with less than about 20 carbon atoms are liquids which facilitate their use in fluids. Alpha olefins are commercially available as specific materials, tetradecene for example. However, the materials are not in pure form, i.e., tetradecene may be 90 percent tetradecene with smaller amounts of decene, dodecene, octadecene, etc., present. Preferred alpha olefin materials are used with preferred impregnants such as the aromatic esters. The aromatic content of the ester is significant and has a significant effect on impregnant characteristics.

For the purposes of this invention, an aromatic ester is one which is produced from both an aromatic acid and an aromatic alcohol. However, as in the case of some esters, the acid is aromatic but the alcohol is aliphatic. The end product, however, is denoted as an aromatic ester for the purpose of this invention. The same is true for an ester of an aliphatic acid and an aromatic alcohol. Where both constituents are aliphatic, the resulting ester is denoted aliphatic rather than aromatic. Preferred esters for use in this invention are the aromatic esters disclosed in U.S. Pat. Nos. 3,754,173, 3,925,221 and 3,833,978, Eustance, all assigned to the assignee of the present invention, and particularly the phthalate esters. The esters used in this invention have a Dielectric Constant of 4 and above, and preferably about 5 and above, and these esters are more prone to gassing problems, particularly under high voltage stress conditions because of increased ionic dissociation. Ionic dissociation increases markedly with increased Dielectric Constant.

Good results have been obtained in the practice of this invention with the use of dioctyl phthalate (DOP), which is referred to as 2-ethyl hexyl phthalate in combination with an alpha olefin material. Other phthalate esters, particularly adaptable for use in the present invention, include the branch chain phthalate esters, particularly those such as isoctyl, isononyl and isodecyl phthalate. These esters may be described as di ios (R) or di (R) phthalate esters where R is from 7 to about 12 carbon atoms. When mixtures of esters and other fluids are used, the ester is preferred to be the major impregnant and the blending fluid the minor impregnant. Such blending fluids may include, as noted in the aforementioned patents, mineral oil and dodecylbenzene, and also certain other non halogenated fluids such as the silicone oils, sulphones, and diphenyls. To the ester/alpha olefin material combination, there may be added such additives as the epoxides, as noted in the aforementioned patents, and quinones as power factor stabilizers, or certain antioxidant containing compounds to prevent oxidation stabilizers are usually added in amounts between 0.01 and 10.0% by volume.

Results of using an alpha olefin material together with DOP, as described, is given in the following examples where, unless specified, the amount of decene material is by volume, and the amount of epoxide and Ionol are by weight. The capacitors of these examples were impregnated as disclosed in the Eustance patents. Both the DOP and the alpha olefin material were carefully filtered and refined to remove impurities such as water and thereafter mixed in the desired quantities. Prior to capacitor impregnation, the impegnant was heated to a temperature in the range of about 50° C. to 120° C., and after impregnation the capacitors were either maintained at an elevated temperature, or subsequently heated to elevated temperatures.

EXAMPLE I

In this example, a group of capacitors were made up generally in accordance with the construction as given in FIG. 1 wherein 0.32 mil thick polypropylene film was used as the sole dielectric strip between the electrode foils, and the capacitor was rated 4 microfarads. In the first instance, the impregnant for these capacitors was the combination of DOP and 1% epoxide (diglycidal ether bisphenol A, i.e., Dow epoxy resin #330) as noted in the aforementioned Eustance patent, and for comparison the impregnant used was DOP+epoxide together with 20% by volume of decene.

| Capacitor | Impregnant | Failed/Tested After After 1,000 Hours 440 Volts, AC (VAC) and @ 100° C. |
|---|---|---|
| 4 μF/290 volts | DOP + 1% Dow 330 Epoxide | 18/49 |
|  | DOP + 1% Dow 330 Epoxide + 20% Decene | 7/45 |

EXAMPLE II

In this example, capacitors of the kind described in Example I with only paper as the dielectric system were tested with a different decene material, hexadecene.

| Capacitor | Impregnant | 775 VAC/100° C. Failed/Tested/Hours |
|---|---|---|
| 8 µF/525 volts | DOP + 1.0% Dow 330 Epoxide | 7/7/1800 |
| 8 µF/525 volts | DOP + 1.0% Dow 330 Epoxide + 20% Hexedecene | 0/15/1800 |

EXAMPLE III

In this example capacitors were made up in accordance with the FIG. 1 construction and ranging from 1¼ inches to 1½ inches in thickness and 2 inches to 6 inches in height. The dielectric was two sheets of paper ranging from 0.45 mil to 0.66 mil thickness. The capacitors of this invention include an antioxidant in the impregnant.

| Capacitor | Impregnant | 1000 VAC/80° C. Failed/Tested/Hours |
|---|---|---|
| 2 µF/660 volts | DOP + 1.0% Dow 330 Epoxide | 9/20/668 |
|  | DOP + 1.0% Unox 221 Epoxide + 10% Tetradecene + 1% Ionol | 0/20/290 Continuing to 9/20/2235 |

| Capacitor | Impregnant | 880V/80° C. Failed/Tested/Hours |
|---|---|---|
| 10 µF/660 volts | DOP + 1.0% Dow 330 Epoxide | 3/20/1400 Continuing to 14/20/3300 |
|  | DOP + 1.0% Unox 221 Epoxide + 10% Tetradecene + 1% Ionol | 0/20/1400 Continuing to 5/20/3300 |

In Example III, the Unox 221 epoxide is dicyclo diepoxy carboxylate and is available from Union Carbide Company as Unox 221. The epoxides are used in this invention together with the described esters, as a basic impregnant combination to which the additives of this invention are included.

The results in Examples I through III show clearly the benefit of this invention by the extended capacitor life or marked reduction of failures. The extended life is obtained in capacitors utilizing paper as the sole dielectric as well as polypropylene as the sole dielectric. While DOP alone has a very high aromatic content and therefore has a high degree of unsaturation, it would appear that it would be a good gas absorber and not evolve gas under the environmental conditions of an operating capacitor. However, since the alpha olefins provide such a marked increase in operative capacitor life, it is believed that DOP alone is not as good a gas absorber in a capacitor environment as one would ordinarily believe from an analysis of this material.

The beneficial results noted in the foregoing examples are fully expected to appear in various other types of capacitors and in various other capacitor dielectric systems. The exemplary results as above noted are relatively independent of the dielectric system involved and the particular impregnation process involved. However, it is known in the art that changes in structure and process may introduce directly related changes in capacitor test results.

As noted, several of the above examples disclose the use of smaller amounts of antioxidant, Ionol, as a further additive. Preferred antioxidants for this invention are taken from the class of substituted aromatic phenols, which include cresols. Ionol is described as 2,6, di-tert-butyl-p-cresol, (Butylated hydroxyl toluene), which is commercially available from Shell Chemical Company under the trade name Ionol. Ionol is used for two important purposes. First, it is employed as a refining aid or purifier in the cleaning and refining process for the DOP. Ordinarily DOP is refined at elevated temperatures by absoprtive filtering through suitable filters to remove inpurities such as highly polar and ionic impurities including water and solids. Ionol is used in the DOP during the complete handling and filtering process to inhibit oxidation where conditions might favor oxidation. Secondly, the role of Ionol in the final capacitor is advantageous, particularly in the beginning stages of operation of the capacitor. The major reason for the Ionol is to have a constant antioxidant protection throughout the handling and impregnation of the capacitor and through its operative life.

The addition of an alpha olefin to the ester fluids has been found to be essentially different than the usual concept of adding stabilizers to capacitor fluids. The usual practice where the additive is a significantly different material than the base impregnant, e.g., epoxide and DOP, has been to use as little as possible since mere incremental additions over a beneficial amount did not appear promising. Accordingly, the epoxides and anthraquinones, etc., were used as additives in the general range of 0.25% to about 1.0%. In the present invention it has been discovered that significantly greater amounts must be used in the first instance to provide protection in the critical early period of capacitor operation. Consequently, the alpha olefin becomes a singificant component or blend.

In the practice of the present invention amounts as great as 30% or more by volume of alpha olefin may be gainfully employed. With the esters of this invention, a preferred range is between about 5.0% and 20.0%. For many of the more common olefins, a range of from 5.0% to 15% is more applicable and a starting amount of about 10% by volume is recommended. The 10.0% value given in the above examples has been found to be quite effective by volume. Where the added amount is less than about 5%, the good effects desired are minimized, and in some instances not easily recognizable, particularly where the gas absorbing difference values are lower. The 5% amount may be correlated with the gas absorbing value of n-octa decene for example, as compared with the same value of an alternate material. The higher molecular weight of olefinic compounds may have less absorptive characteristics and therefore be required in larger amounts. Examples are dodecene, tetradecene, octadecene, etc. Larger amounts require careful attention to capacitor compatibility and impregnant electrical, viscosity and flash point characteristics.

In connection with the addition of relatively large amounts of alpha olefin, their selection should also be made with regard to Dielectric Constants. The alpha olefins of this invention have Dielectric Constants below that of DOP and generally in the range of 2.2 to 2.4. Consequently the DK of the resulting mixture is lowered with further resulting lower capacity. Further, it should be significantly gas negative over the gas negative range of the capacitor. For example, hexadecene has a gas rate of −16 to −18 in the 40° C. to 60° C. range while DOP has a gas rate of about −4.4 to about −3.9 over the same range. A minimum difference of from −5 to −10 is a preferred range between the two materials. This difference value also corresponds to the kind and amount of gas negative material used.

The alpha olefins materials have a unique gas absorption characteristic. For example, in a capacitor the sites where gas is being generated are likely to be high stress, hot spot areas, and it is desirable to improve gas absorption with increasing temperature because of these hot spots. DOP for example does not exhibit any increase in gas absorption with increasing temperature in the range of 40° C. to 90° C. The gas absorptivity generally decreases as temperature increases. However, alpha olefins exhibit an enhanced gas absorption between 40° C. and at least 60° C. At 60° C., decene has approximately 23 times the gas absorption ability as DOP.

The alpha olefins of this invention have a favorable double bond to molecular weight ratio and are therefore excellent hydrogen absorbers. The double bond in decene, for example, saturates by absorbing hydrogen which is the major gas given off in electrical discharges in capacitors or in chemical dissocation. Specific alpha olefins having 10 or more carbon atoms are shown to be very effective in phthalate ester impregnants and are compatible with antioxidants and epoxides in a capacitor environment.

An epoxide addition to a DOP impregnated capacitor appears to ameliorate the hydrolysis problem by significantly preventing water formation. An antioxidant addition is favorable to the elevated temperature impregnation process. The alpha olefin of this invention is effective in these combinations by cooperatively acting to absorb hydrogen. A hydrogen atom may combine to form an acid to which is rendered ineffective to a significant degree by the epoxide material, or the antioxidant may remove oxygen before it can be combined with hydrogen to form an acid or water. The alpha olefin may also trap the hydrogen atom before either deleterious event may occur and thus short circuits the chain of events leading to early capacitor failure.

The olefinic materials of this invention may be added to other base impregnants where the same problems are recognized to be significant and the conditions are similar to those as herein described. For example, fluids having a dielectric constant of about 4 and above are more prone to gassing under high stress conditions because of increased probability of ionic dissociation. Among those base impregnant materials are the silicones, sulfones, non halogenated diphenyl compounds, and mixtures thereof. For these impregnants as olefinic material having only aliphatic compounds and a high hydrogen gas negative value are preferred.

The improved impregnant of this invention is particularly suitable for metallized capacitors where the capacitor electrodes are metallized surfaces on a dielectric strip. A typical composition would include DOP, an epoxide, and a decene material, with or without an antioxidant.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of this invention.

What is claimed as new and desired to be secured by Letters Patent of the United States is:

1. In a process for impregnating capacitors with a gas absorbing impregnant including the steps of purifying a phthalate ester impregnant by adsorptive filtering said impregnant to remove impurities and impregnating the capacitor with the purified impregnant, the improvement comprising the additional step of adding 5 to 30% by volume of an alkene having from 10 to less than about 20 carbon atoms and 0.1 to 10% by volume of an epoxide stabilizer to said purified phthalate ester impregnant prior to impregnating the capacitor.

2. The method of claim 1, wherein said alkene is decene, said epoxide stabilizer is a diglycidyl ether of Bisphenol A and said phthalate ester is dioctyl phthalate.

3. The method of claim 1, wherein said alkene is hexadecene, said epoxide stabilizer is a diglycidyl ether of Bisphenol A and said phthalate ester is dioctyl phthalate.

4. The method of claim 1, wherein said alkene is tetradecene, said epoxide stabilizer is a diglycidyl ether of Bisphenol A, and said phthalate ester is dioctyl phthalate.

5. The method of claim 1, wherein the additional step includes adding an effective amount of an antioxidant.

* * * * *